US009690779B2

(12) United States Patent
Wu

(10) Patent No.: US 9,690,779 B2
(45) Date of Patent: Jun. 27, 2017

(54) QUASI NATURAL LANGUAGE MAN-MACHINE CONVERSATION DEVICE BASE ON SEMANTIC LOGIC

(75) Inventor: Zheng Wu, Shanghai (CN)

(73) Assignee: Pentedge (Shanghai) Software & Consultancy Co. Ltd., Shanghai (CN)

( * ) Notice: Subject to any disclaimer, the term of this patent is extended or adjusted under 35 U.S.C. 154(b) by 874 days.

(21) Appl. No.: 13/695,051

(22) PCT Filed: Apr. 26, 2011

(86) PCT No.: PCT/CN2011/073328
§ 371 (c)(1),
(2), (4) Date: Dec. 4, 2012

(87) PCT Pub. No.: WO2011/137724
PCT Pub. Date: Nov. 10, 2011

(65) Prior Publication Data
US 2013/0204610 A1    Aug. 8, 2013

(30) Foreign Application Priority Data

May 6, 2010  (CN) .......................... 2010 1 0168024

(51) Int. Cl.
*G06F 17/27*    (2006.01)
*G06F 17/28*    (2006.01)

(52) U.S. Cl.
CPC .......... *G06F 17/289* (2013.01); *G06F 17/279* (2013.01)

(58) Field of Classification Search
CPC .. G06F 17/2785; G06F 17/2881; G06F 17/27; G06F 17/279; G06F 17/30731; G06F 17/30684; G10L 15/30; G10L 13/08; G10L 15/22; G10L 13/027; G10L 15/1822; G10L 13/00; G10L 13/07; G10L 13/047; G10L 15/19; G10L 2015/228; G10L 2021/02168; G10L 21/0208; G10L 15/24
USPC ..... 704/1–10, 270, 235, 250, 251, 255, 257, 704/277

See application file for complete search history.

(56) References Cited

U.S. PATENT DOCUMENTS

| 6,311,159 | B1* | 10/2001 | Van Tichelen | .......... G10L 15/18 704/251 |
| 6,792,086 | B1* | 9/2004 | Saylor | ................. H04M 3/4938 379/88.04 |
| 2006/0229867 | A1 | 10/2006 | Brownsey | |

* cited by examiner

*Primary Examiner* — Huyen Vo

(57) ABSTRACT

The presented is a tool and method for language presentation, browsing, editing, translation and communication based on Semantic Web, to be utilized as interface for collaborating software products and services or human-machine interaction. The conceptual system is extended to further include such objects as language components, sentence patterns or syntax rules, to get solutions for semantic logic representation devices, language presentation devices, semantic-language converting devices, the registry and delegation system, in forming a language-component-based system for browsing, editing, conversion and communication. It is always allowed to bring need-based control over the conceptual system and the registry with their scope and scale being kept at appropriate level; with a widespread community participation, the establishment of semantic-language converting device ecosystem will be important guarantee of a flexible and diversified language expression system; therefore to constitute the core of those pragmatic standards or specifications for machine translation, human-machine interface and the web system.

11 Claims, 4 Drawing Sheets

QUASI NATURAL LANGUAGE MAN-MACHINE CONVERSATION DEVICE BASE ON SEMANTIC LOGIC

TECHNICAL FIELD

The present invention relates to semantic logic based system and apparatus for language presentation, browsing and editing; the system and apparatus can be utilized as a collaborating interface for application and service or as a human-machine interaction interface. Particularly, the present invention relates to the establishment of conceptual model for objects such as language component, sentence pattern or syntax rule and the like, which further grounds technical solutions for language presentation markups, browsing, editing and conversion. Wherein, either natural language or machine code may be chosen as working language in representing semantic logics; The language component conceptual model is always flexibly under users' control with its scale and ranges being kept at an appropriate level for sake of system efficiency, accuracy and feasibility; as such a language specification that is more practically acceptable can be made available for machine translation, human-machine interaction as well as the architecture of the web system.

The present invention relates to semantic web, representation of language components, sentence presentation, sentence templates, representation of sentence pattern, representation of syntax rule, representation of knowledge, natural language processing, language conversion, machine translation, human-machine interface, and question-answering system.

The objective of the present invention is to create a language specification and human-machine interaction system which can be utilized for general purposes and can constitute the core components of a framework system for information exchange and processing in the modern information society.

The objective of the present invention also includes providing effectual measures for lexical content input and editing. Although the contemporary information technology has made available a wide variety of word processing programs as typically exemplified by MS WORD, the lack of direct semantic-based editing support is considered a defect commonly existed in those products and services; nevertheless other semantic logic oriented text editors, such as XML editors, so far are in no sense an ideal substitute due to the lack of necessity user friendliness, flexibility and openness in their user interface.

The objective of the present invention further includes providing a general-purpose system incorporating various technical solutions for language text conversion or translation. Whilst there exists many available technical solutions for natural language translation, XML code generation or other machine code generation, the present invention provides a new framework solution which not only suits the identical purpose but also is compatible to the existing technical solutions, enabling parallel applications to run jointly together within this particular domain with each of them being fully taken advantage of.

The objective of the present invention further includes providing a natural language based human-machine interaction interface for various applications and services to run on a general-purpose platform, which is both flexible and open so as to achieve improved user experience.

Assuming that the type of text documents in conforming to the new specification had achieved its popularity as other prevailing word documents as typically exemplified by MS-WORD documents, wherein not only the content of documents is always under user's free control, i.e. the whole or part of document maybe easily selected and shared with others, but also each part of the selected contents are machine readable and thus maybe utilized for improved automatic processing, a new times of logical Internet would probably have already come.

BACKGROUND ART

Background arts related to the present invention mainly include such technologies or solutions as Resource Definition Framework (RDF), Semantic Web OWL, object-oriented programming, and representation of language component, natural language processing model, machine translation and executable natural language. A vast number of technical papers as well as tens of thousands of patent literatures can be found in the related technical fields.

HTML is a kind of formalized presentation language, but it has failed to get rid of the restriction on its design which largely aims at character or textual based word processing or presentation and interaction. For this reason its wider spread application may only be possibly achieved by making embedment of additional semantic logic markups thereto. Although RDF and OWL are handy tools for semantic logic representation, yet still, comprehensive and efficient editing devices are inevitable for complex semantic content editing, as desperately needed in real world applications.

RDFa is a technical solution with embedment of RDF conceptual objects within other prevailing markup languages, e.g., putting additional attribute markups into HTML tags, but yet still, it is far from being a quick solution from the perspective of a descriptive language for semantic content.

XForm is a typical XML based solution for data input. Generally speaking, no matter from whichever user interfaces in conforming to whatever specifications, every piece of data can eventually be represented in XML, for this reason each of those user interfaces like XForm may be regarded theoretically as means of XML editing. Nevertheless, XForm is in no way a competent solution from the perspective of a complete solution competent for natural language presentation.

Prior arts typically relevant to the present invention are listed as following:

"Object oriented information server, preparation method and browser" (CN200410055435.2, 2004.07.27, G06F17/30 (2006.01), Zheng WU);

"Apparatus for sentence constituent and sentence constituent based method for multilingual professional translation" (CN200910129096.0, 2009.03.15, Shugen LIU);

"Method for unified coding of semantic content in natural language" (CN02153705.4, 2002.12.02, Sha LIU);

"Expression and obtaining method of natural language sentence cluster" (CN01145132.7, 2001.12.30);

"Stipulated-semantic-content-based system and method for full text translation" (CN02131412.8, 2002.10.10, G06F17/28, Sha LIU); "An open method for all-text-all-selectable-template-based machine translation with complementary user interaction" (CN98125015.7, 1998.11.20, Sha LIU, Primary IPC: G06F17/28); "Apparatus and method for deterministically constructing a text question for application to a data source" (WO/2006/110372, 04.04.2006,, BUSINESS OBJECTS, S.A., B25C 5/06 (2006.01)).

Although having many aspects more or less overlapped with or relevant to the above technical solutions in related technical fields, the technical solution of the present invention in its entirety is one substantially distinguishing itself from the prior arts.

SUMMARY OF INVENTION

Based on language component conceptual model, the present invention set forth semantic logic representation devices for language components and a variety of language presentation devices along with their converting devices; wherein, embedded with semantic logical markups, the language presentation devices are to be interpreted and converted into its semantic logic representation devices. As such, a variety of translation or conversion may be carried out for different languages; and with the above mentioned embedded markups, semantic logic content contained in language presentation devices may be modified, transformed or even imposed with some other operations.

It shall be noted that each embodiment of said devices in the present invention consists of one or more information processing devices with associated program codes or markup languages. Said information processing device can be various computer systems, mobile phones, portable devices or other information processing devices no matter their size, each of them commonly consists of one or more CPU, memory, screen, keyboard, mouse or other peripherals as well as other system software or drivers running on those devices. The embodiments of the present invention are specific extension to those systems through the embedment of additional program codes, markup languages for domain specific application of any kind.

1. Conceptual System of Language Components

To classify and to assign markups as well as names to each object in a conceptual system are important prerequisites to the present invention. The present invention includes a process of constructing a hierarchically classified conceptual system, which is, for instance, conducted by identifying such conceptual objects as super classes, subclasses and properties. It is also very important to understand that property objects are essentially a way of relationship representation between conceptual objects. Particularly in the present invention, a conceptual system for language components is further established based on the generic conceptual classification system, which is to be regarded an extension to the generic conceptual system.

To establish the conceptual system, although RDF, OWL and other RDF based specifications may be taken advantage of, there are also some other ways in which the conceptual system may be defined. The Chinese patent CN200410055435.2 titled "Object oriented information server, preparation method and browser" obviously provides helpful technical solution in the establishment of the conceptual system. Including a pseudo natural languages user interface, the preferred embodiments of the present invention may also counteract and contribute to the establishment of such conceptual systems with an intuitive user interface. It is the establishment of an automatic reasoning system that explains why it is important to put all of those different technical solutions into place in constructing such a conceptual model. It is the automatic reasoning system that further holds the foundation of the preferred embodiments of the present invention.

Language component class object is to be established. The Language component as an abstract class object is to be the root class for other classes in the language component system. Although this language component system has a wide coverage, it includes at least such object as constituent of sentence, sentence, paragraph, document, and so on as subclass of language component class. First of all is sentence constituent object. Each sentence constituent is constituted of a conceptual object which is actually peered to an existence in the real world. From perspectives of different languages, each conceptual object varies in its names. Apparently varying in its names, an object may actually refer to identical one thing but nothing else even in different languages. Such uniqueness nature holds the major theoretical foundation in applying URI or other unique identification code. The class of sentence is a conceptual object that mainly has one or more subjects, predicates, objects and other constituents, and therefore, the corresponding program module for this class object consists of the identification code and programming code accessing the three types of member objects as its property values. The sentence class objects are specifically utilized in creating association of one object to another in the conceptual system. Because of the use of sentence, the conceptual system changes from time to time and turns into a dynamic subjective system that is constantly synchronized with the real world.

As pronoun or indefinite pronoun, a variable object is essentially to be introduced for sentence constituent. This means that a sentence constituent may be either an indefinite or a definite conceptual object. For instance, "a person" and "any person" is actually a variable to represent one or more member objects of human being class that is yet indefinite.

As a pronoun concept, a variable is the logic representation of objects that are indefinite or yet still remain unknown, but a plurality of sentences may put into use to describe the property values of the object to characterize it, i.e. a process of delimiting and setting constrains on the indefinite object. As constituents of sentence, variables will definitely be helpful in completing the above delimiting process, whilst making it possible for content of a sentence constituent to be of almost no limited complexity, for the overall structure and proceeding in semantic logic representation remain to be simple and easy. (From this perspective, it is the number of variables in its constituents, e.g. subject, predicate or object and the complexity of its semantic logic content that mostly differentiates a simple sentence and a complex sentence).

Although the subject and object constituent of a sentence may either be definite or indefinite conceptual objects, the nature of the predicate constituent should serves as the basis for determination of the range for each of the subject and object constituent. Either as a behavior concept (verb, a noun for naming a particular behavior) or a property of the subject constituent (noun, as property name), with its domain (RDFS.domain) and range (RDFS.range) properties, predicate constituent of a sentence is to be utilized in delimiting the subject and object constituent of the sentence in order to construct a valid well-structured sentence abiding by a set of given semantic rules.

A compound sentence is a sentence that comprises a plurality of sentences, thus the corresponding program module as its logic representation device comprises the program modules for each of those constituent sentences plus one or more conjunctions indicating the interconnection of those sentences as well as the set of necessity program codes. Reasoning rules and queries are typical sentence types that exemplify the use of compound sentence. A reasoning rule generally includes a precondition and a conclusion component. Each of those two constituent components is usually defined with one or more sentences; a query sentence essentially includes a precondition part which is also defined by a group of sentences. Notably, as pronouns, in each of the above two cases, variable plays an important role. It is variable that sustains the pervasiveness of a reasoning rule definition; it is variable that the definition of the item selected in a query, the target concept of user's particular interests, has been made possible. Similarly, a paragraph is a language component consisting of sentences and therefore its logic representation device is a program module that includes a group of program modules for each of the constituent sentences plus a set of overall controlling program codes. As a language component, a document consists of a plurality of paragraphs and therefore its logic representation device is a program module that contains program modules for its constituent paragraphs plus a set of controlling program codes.

2. Logic Representation Device and Language Presentation Device

As far as language component representation is concerned, semantic logic representation and language presentation are the two aspects of the technical issue to be addressed in particular. From the perspective of semantic logic representation, each language component is to have an established logic representation device (1) which is a program module. Associated to the program module are such properties as the types (e.g. sentence, constituent of sentence), the name of language currently put in use and the content of its constituent components, etc, and, as such, a set of program codes should be included facilitating accesses to its properties' values. In addition to this, two essential member functions are also to be included in the semantic logic representation device (1), one is function (11), format (Locale locale) and the other is function (12): parse(ClauseExp clause) (the function (12) is optional and thus may not be included in the claims). As all other language components are subclasses directly or indirectly derived from this super class, it is the two member functions that are included in all other language component program modules inherited from this program module, whilst each of the two member functions may have varying internal implementation.

To process the language components involved, it composes a process that a sequence of procedure calls are recursively forwarded to the above two functions followed up with a comprehensive treatment dealing with all the results each returned. This sort of design leads to a simplified coding structure for the overall controlling program, as polymorphism, one of the important features of Object Oriented Programming Language, has been fully taken advantage of. When called upon, the function (11), format (Locale locale) is to convert a logic representation device (1), referred to as Clause, into a language presentation device (4), referred to as ClauseExp. As language identification (6), Locale is put in use as input parameter. The ramification is that each procedure call with varying language identification parameter (6) input will possibly come up with one or more results due to the difference of its internal arrangement and adjustment made to each implementation abiding by a given set of grammar or syntax rules of that particular language variant. Locale is a concept includes one or more properties such as language (Language), country (Country), and variant (Variant). The Locale concept may be better understood with reference to the Locale.class in the JAVA language. When called upon, the function (12), parse(ClauseExp clause), converts a language presentation device (4): ClauseExp into an instance of logic representation device (1) Clause. The underling matter of fact is that the language presentations or formalities may vary significantly even though their semantic logic contents are identical.

If required, each logic representation device (1) is allowed to be separately processed to derive different language presentations or formats for its constituent semantic content. To convert a semantic content into language presentation, it is the function (11) of its semantic logic representation device (1) that is to be called upon. With a given language identification (6), locale as input parameter, the procedure call is to forward to each of the function (11) of the logic representation devices (1) for its constituent paragraphs or sentences; the function (11) of each of the semantic logic representation devices (1) for the paragraphs or sentences will further forward the call to the function (11) of each of the semantic logic representation device (1) of its constituent sentences or sentence constituents; this way each corresponding set of program codes in consequence are executed recursively and all of the call results returned are combined together in an appropriate manner for each of the language presentation devices (4) ultimately to be constructed at each level of its hierarchical semantic logic.

A language presentation device (4) consists of a symbolic system and set of markups presenting data in a given language, plus a set of program codes associated with information processing device. However, a language presentation device (4) characterizes itself with a set of additional semantic logic markups embedded. The set of markups are to be accessed by machines in facilitating respectively the identification and manipulation of the type, content, range, language type of semantic logic content currently put in use; and as well in facilitating the retrieval of its language-to-semantics converting device (3). The set of markups are transparent to end users, i.e. they will not perceive its existence. Bottom line is that the set of markups helps machine efficiently identifying complex semantic structure and content behind the scene of language component presentation, thereby to the highest extent avoiding ambiguity.

Special attention is worthy to be given to the fact that every conceptual object is to be represented with a unique identification code as well as its names. This nature evidently differentiates a new solution from a traditionally solution that is purely plain text based. According to one particular embodiment of this invention, each conceptual object may actually be a hyperlink where it is the name of an object to be presented to users rather than the URI and other markups, the later is the part constantly staying transparent to users. Although their names vary significantly, objects may have identical unique identification code that is machine accessible, thereby making it possible to avoid ambiguity in processing semantic content.

As part of language presentation device (4), the set of program codes may be allocated either with its accompanied markups in one container implementation or stay separate from it within a third party container implementations as its subset of program codes; as implementation of language presentation device (4), although character literal may be one type of language presentation, voice and other types of media may be also optional presentations for natural language; the establishment of semantic markup system may be accomplished by either establishing a new markup systems or putting currently available markup system into reuse for indirect semantic logic representation.

3. Semantics-to-Language Conversion and Its Delegation

Different conversion implementations are always required in converting a single language component from one of its semantic logic representation device (1) to its language presentation devices (4) of different variety or formats due the difference of language habits, variety and syntax rule. To this end, a delegation mechanism is included in the present invention through the function (11), as detailed in the following paragraphs, A registry is to be established for a set of semantic logic representation device (1) and their corresponding semantics-to-language converting device (2). The registry may have its implementation concreted with either a database, in-memory dataset or other data structures whatever; it may also be either a plug-in management system or index automatically created by a compiler in locating the set of program codes or markups as required.

For each one or set of the semantic logic representation devices (1), one or more semantics-to-language converting device (2) are to be registered with the system, which may be referred to as Formatters. When called upon, the function (11): format(Locale locale) will start to retrieve from the registry a formatter with the particular locale input as parameter, and forward the call to the formatter where the task implementation is delegated thereto. Because as many as required Formatters may be registered for each language variant, it becomes feasible to get flexible and diversified services for semantics-to-language conversion reflecting the diversity requirements of grammar or syntax rules. In particular, the semantic-to-language converting device (2), Formatter, includes at least a function (21). When called upon, with a semantic logic representation device (1) as its input parameter, the function will convert the input semantic logic representation device (1) forward into a language presentation device (4) in conforming to a given set of grammar or syntax rules or language habits.

For each one or set of language presentation devices (4), language-to-semantics converting devices (3) are to be established, in each of them includes a function (31). When called upon, the function (31) will come into service to convert the symbolic presentations contained in a specific language presentation device (4) backward into its corresponding semantic logic representation device (1). As required, this process may even be applied to each of the language components contained in a language presentation device (4) individually, for the purpose of, as such, conversion from any part of textual presentation in a language presentation device (4) backward into its logic representation device (1). The steps contain a process of, for the given language presentation device (4), identifying and then retrieving the constituent language components and their corresponding language-to-semantics converting devices (3), following up with calls upon each of their corresponding function (31) and then a comprehensive processing operation imposed on those call results returned, as detailed in the following, As called upon, the function (31) of the language-to-semantics converting device (3) corresponding to the current located text will forward call to each function (31) of the language-to-semantics converting devices (3) for its constituent paragraphs or sentences, following up with an adequate processing operation imposed upon the results returned; as called upon, the function (31) of the language-to-semantics converting device (3) for the above paragraphs or sentences forwards call to the function (31) of each of the language-to-semantics converting devices (3) for their constituent sentences, with a following up adequately processing upon the results returned; the function (31) of the language-to-semantics converting device (3) for the sentence is to forward calls to each of the function (31) of the language-to-semantics converting devices (3) for its sentence constituents, with a following up adequate processing operation imposed upon the results returned; and as such the proceeding analogously repeat the steps this way, as turned out to be a procedure that each set of the program codes is executed recursively aiming at the conversion of textual presentation contained in language presentation device (4) into its logic representation devices (1).

What does it actually mean by a predicate-based or property-oriented process in constructing converting device (2) as well as its registration or indexing? It is another technical issue needs to be addressed in further detail. For a sentence object, its converting device (2) may be constructed based on the content of the sentence's predict constituent (either a verb or a property name of a conceptual object). As a special type of RDF.property, a verb also has associated domain and range (RDFS.domain and RDFS.range) properties; with the two properties a verb can also be put in use in delimiting the subject (the subject of a behavior) and object (the object of a behavior) of a sentence. With additional prepositions and adverbs appropriately utilized in connecting each conceptual object in the sentence, the framework solution is then shaped up for a sentence representation that is predicate-centric. Within sentence representation of this type, each of its constituents may be edited or modified with the assistance of the language-based dialog device (5). This sort of design is in line with the matter of fact that any change to the predicate constituent of a sentence may result in the change of the sentence pattern in its entirety; as this occurs, the content of other constituent components of the current sentence ought to be shifted into the new structure open for further adjustment and modification by the user. It is the domain and range (RDFS.domain and RDFS.range) properties that have been utilized to get the improved solution in delimiting a valid sentence according to semantic logic rule, avoiding the weakness that existed in a sentence validation solution that is purely grammar or syntax rule analysis based. For this reason, the contents of domain or range are to be included in the semantic markups so as to define the scope of each language component.

4. Language Based User Interface

A language-based dialog device (5) is a type of browsing and editing device for semantic content, including a set of program codes associated with information processing devices, and is characterized with the containment of a set of semantic logic representation device (1), semantic-to-language converting devices (2) and language-to-semantic converting devices (3). The functionalities of the said dialog device (5) and its implementation steps are detailed as following:

1) Browsing. It is the language-based dialog device (5) that renders text or symbols in language presentation devices (4) to put them on a display for users in a certain manner. The embedment of semantic logic markups, which facilitates coming-up internal implementation of such functionalities as editing and translation, though it is transparent to users who will not perceive their existence. To this end, HTML and the like may be optional implementation markup languages for language presentation devices (4), with additional semantic logic markups reasonably embedded, the content is then ready to be displayed with a web browser thereof.

2) Locating language components. The language-based dialog device (5) consists of an array of language component editor interface, a set of user interfaces, and also assists the locating of language component. The set of language components that may be located or be targets receiving user focus includes subject, predicate, object, sentence or paragraph. The implementation of the locating program module is detailed as following:
(1) Judging if a region belongs to a language component on which the user is paying attention (e.g. a place user points at with mouse click); the semantic logic markups embedded may be utilized for assisting the judgment or even judging the type of the language component.
(2) In case of a sentence type, the component will be set to be the target component located;
(3) In case of a sentence constituent, judgment is to be made to see if the component is target component locatable (focusable) for editing (e.g., by reading out the writable attribute value);
(4) If it is a locatable component, the sentence constituent component is set to be target component located; otherwise, the sentence which the constituent component belongs to is set to be target component located.

3) Create and insert language components. It is the program module for the locating of language component that the language-based dialog device (5) is based upon in providing efficient supports for language components to be created and inserted. Steps are detailed as following:
(1) the program module for insertion operation is to be triggered into execution by user input events, e.g. an event triggered by a mouse, keyboard and other device operation;
(2) based on the content of the current located language component, the program is then to determine the types of valid language components acceptable to the located language component;
(3) the program is further to determine the target position of insertion or the types of valid operations acceptable the located language component, e.g., a replacement of located language component, and imposing insertion before or after the current located language component;
(4) waits for user's confirmation on choice of the options presented;
(5) an instance of semantic logic representation devices (1) for the chosen type of language component is created and the function (11) affiliated to the instance is called upon to generate its respective presentation device (4), which is then put into the chosen target position as a result of chosen operation, the newly inserted content is actually a copy of blank or placeholder language component structure; to edit or modify the blanked content is now the only thing needs to be done by the user in creating a new language component.

4) Editing and modification. Language component based editor is kind of content editor designed to carry out operation on located language component. According to the semantic logic markups, the language-based dialog device (5) imposing parts or all of such editing operations on located language components as to delete, modify, copy and paste, drag and drop and so on. The steps involved are detailed as following:
(1) To delete a located language component, the only step required is to remove the node (an HTML.TAG node, for instance) where the component is rendered from its document node tree;
(2) to copy and paste a language component, a data structure in representing the current located component (e.g. its semantic logic representation device (1)) will get a copy stored in the system clipboard; during a paste operation, the program is repeatedly triggered into execution relocating a new language component, following up with an extraction of the clipboard content and an operation carried out of user's choice for a replacement or insertion of the newly located component at, before or after the position where it is placed; if necessary, the extraction of semantic logic markups associated with the newly located component may be carried out simultaneously in judging if the clipboard content is valid for the above paste operation or figuring out the types of valid operations for user's options;
(3) to drag and drop a language component, it is about an analogous process to that of the above copy and paste. As the drag operation starts, a data structure for the located component (e.g., the semantic logic representation devices (1)) gets a copy stored in system transferable module and the program for locating language component is repeatedly triggered into functioning switching located components as a consequence of constant mouse drag, accompanied with an extraction of semantic logic markups for the newly located component to figure out the set of operations valid for the transferrable data contained before presenting them to the user for options; as the drag ends, for an invalid operation abide by semantic logic rule, either a rejection or notice for user's attention may occur, to continue or cancel is all up to user's choice; whatever, the user may choose either a replacement or insertion at, before or after the position of the current located component; accompanied with the drag operation, if it is necessary, is a simultaneous extraction of semantic logic markups associated with the newly located component facilitating the process of judging if the transferrable data is valid for the operations above or figuring out the set of valid operations for user's choice;

In brief, the functionality of editing and modification of language component above contribute to efficient operation as to create or duplicate a sentence. In contrast to a traditional textual literal based input solution, it is a solution leading to the elimination of large amount or frequently repetitious inputs and keyboard operations, which as such a solution holds inevitable efficiency advantage.

5) Specialized Editor for sentence constituent. The language-based dialog device (5) contains an array of specialized editor user interface for the content of each types of sentence constituents as located component, steps are detailed as following:
(1) The editor user interface is responsible for the delimitation of the current located component facilitated by reading out the markups embedded (a specialized markup for its range is included in the markups embedded, or get the range worked out through calculating on content of other language components in the concerned context);
(2) based on the input of user's choice, e.g. one or more words or characters, a constrained search is to be done within the range, the workout of the above step, seeking a result of either an object or a list of optional objects to be presented to the user for his/her further selection of desired input; or otherwise, only those from within a frequently referenced data list (e.g., history list) that meet the constraints are to be filtered out and presented to the users further for their options;
(3) alternatively, user may choose to have sentence constituent inputted directly, which is either a literal, i.e. a string, a number or a conceptual object, i.e. an instance of RDF.Resource. For literal type, inputs are to be done through keyboard type-ins whenever required; for conceptual object, user may even to choose to input an object which is newly created on-the-fly, facilitated by, though as it is necessary, an specialized editor user interface for input of such relevant information as its unique identification code, name and the like;

(4) operation is then to be carried out for a replacement of the current sentence constituent, the located component, with the input, either a type-in input or a conceptual object selected from the option list presented. This may also be accompanied with, as it is necessary, a simultaneous input validation. For an invalid input, it leads to either a rejection or an extra embedment of additional markups (e.g., markups for different background colors), as indicator of the input error prompting for user's further correction.

6) Translation or conversion. The language-based dialog device (5) provides a specialized window like user interface facilitating the translation or conversion of a located language component in achieving its flexible separate language presentations, implementation steps are detailed as following:

(1) From the embedded markups, get reads-out of the attribute value in locating the language-to-semantics converting device (3) particular for the current located component;

(2) Get an instance of the language-to-semantics converting device (3) for the located component according to the markup reads-out above;

(3) Carry out conversion of the located component from its language presentation into its logic representation devices (1) based on the result above;

(4) Locate and get all instances of the semantics-to-language converting devices (2) valid for the logic representation devices (1) above before further presenting them in an appropriate manner for user's options;

(5) Forward procedure call into the function (21) of the semantics-to-language converting device (2) chosen from above options, to create an instance of the language presentation device (4) exactly for that very located component;

(6) Carry out operation for a replacement of the very located component with the language presentation device (4) above or alternatively further present it to the users for their reference. In brief, it is the steps above that guarantee a consistent conversion of a semantic content.

7) The registration and manipulation of converting devices. Seeking ensured flexibility in language conversion, it is necessary to establish an array of converting devices (2) and (3) and bring need-based control to the registry with respect to its scope and scale; To this end, the language-based dialog device (5) is required to become an open platform for user-machine interaction, the implementation steps are detailed as following:

(1) A mechanism is to be established for the registration and manipulation of semantic logic representation device (1), converting devices (2) and (3) for semantics representation and language presentation.

(2) A specialized user interface is to be established facilitating the carrying-out of the above step, so that the registry is scalable and adequate to users' needs and other newly created converting devices (2) and (3) for semantics representation and language presentation may also be allowed to import to or be registered with the system dynamically provided that they are conforming to given specifications.

In brief, it is such an open platform that supports the use of those semantic logic representation device (1), converting devices (2) and (3) from third party vendors, that as such further contributes to the promotion and development of different domain applications.

8) Human-machine interaction platform. The language-based dialog device (5) may work as user interface for other software products and services (555) so that users are allowed to interact with the information world in a manner they are familiar with, seeking reduced learning cost. The implementation steps are detailed as following:

(1) As required, on user's behalf the language-based dialog device (5) is to transmit a language presentation device (4) with embedded semantic logic markups to a third party application or service (555) in an appropriate manner;

(2) the third party application or service (555) will then start to convert the language presentation (4) into an acceptable language format for further process operation before a result is achieved and returned, the result, though, is possible another instance of the language presentation device (4) for its representation;

(3) upon receiving the results or message from the third party application or service, the language-based dialog device (5) starts a language conversion, as it is necessary, before either presenting them to the user, yet still in a format of language presentation device (4), or carrying out a following-up operation on the result.

9) Content persistence and sharing. The language-based dialog device (5) is able to have all the symbols and markups contained in language presentation device (4) saved into different storage media for their direct or indirect persistence, and thus the content may be shared across the whole network. The implementation may compose a process of conversion, sustained by the translation and conversion functionality above, into a document in a given markup language, e.g. an HTML, a sort of plain-text based documents ready for persistence and share, the type of document differentiates itself from a legacy document with the fact that the semantic logic content contained in the document may be both understood by a human user and directly accessible by a machine; the fact that the users are allowed to perform swift editing operation and making choice to its content and bring control to the content of a document sharing among different scopes of audience; the fact that it turns out to be an information processing solution for improved automation and system efficiency.

BRIEF DESCRIPTION OF THE DRAWINGS

1. Illustrations of the connection between devices for semantic logic representation and language presentation.

2. Illustrations of logical connection of converting devices for semantics representation and language presentation.

3. Illustrations of language-based dialog device.

PREFERRED EMBODIMENTS OF THE INVENTION

Figure 1:
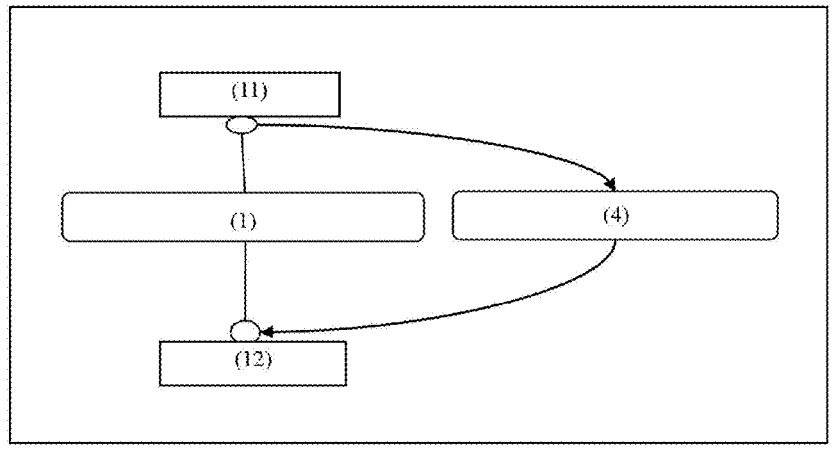
FIG. 1 shows the relationship between a semantic logic representation device (1) and a language presentation device (4) alongside the associated function (11) and (12).
Figure 2:
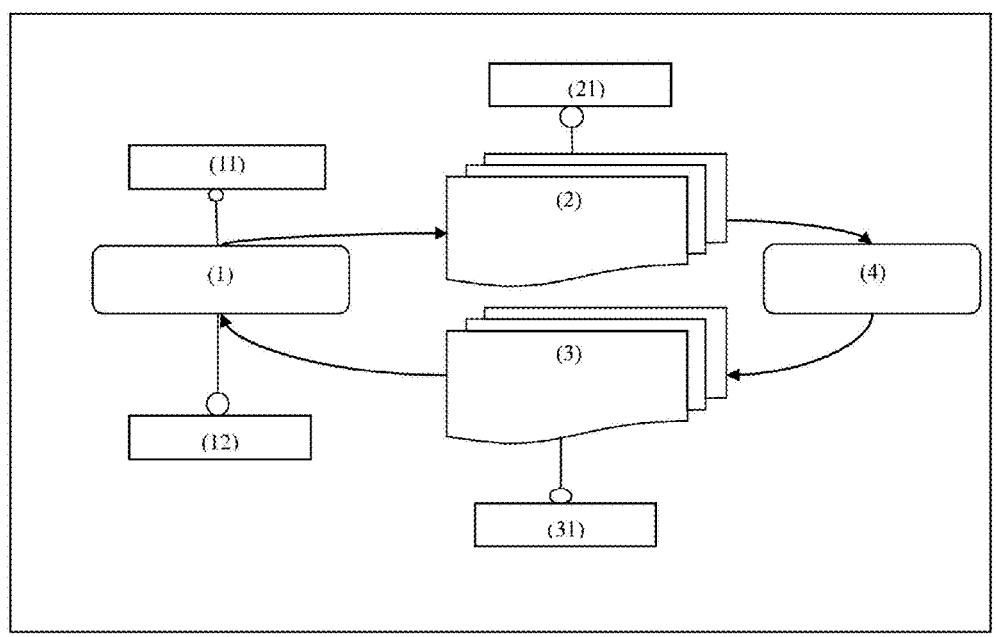
FIG. 2 shows how converting devices (2) and (3) for semantics representation and language presentation are logically connected to a semantic logic representation device (1) and language presentation device (4). Function (21) and function (31) are the two functions provided respectively by the converting device (2) and (3) for semantics representation and language presentation.
Figure 3:
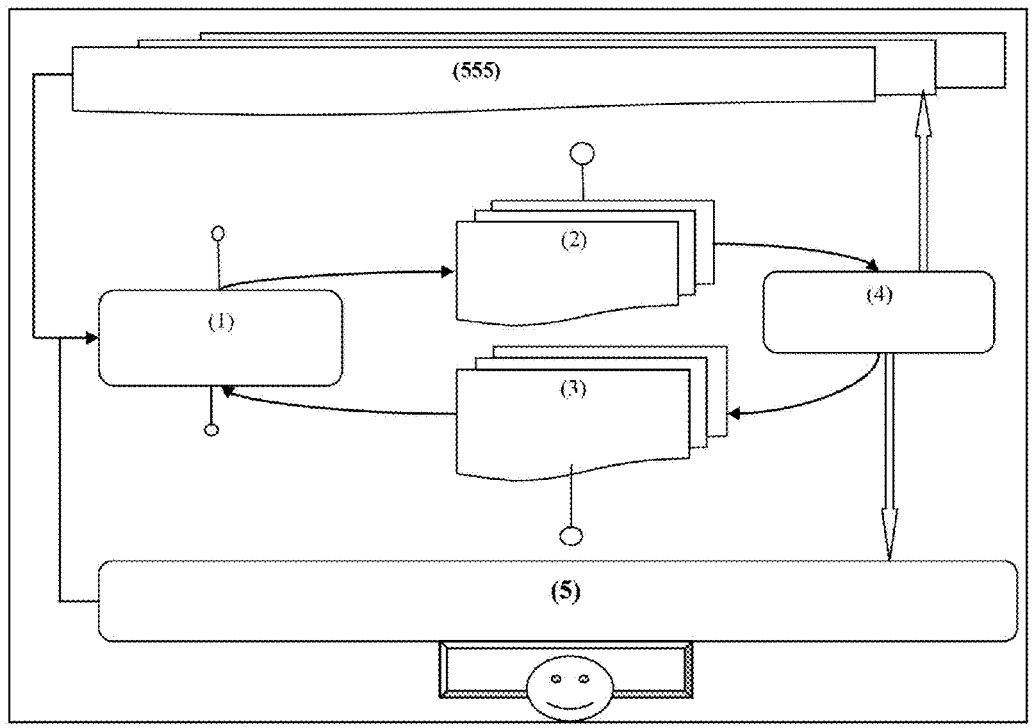
FIG. 3 shows an overall picture on how converting devices (2) and (3), semantic logic representation device (1) and language presentation device (4) are combined together and as a whole connected to language-based dialog device (5) as well as third party application and service (555). The (5) and (555) are two collaborating peers based on device (1) and (4), both of which are either generated or interpreted by device (2) or (3).

There exist many approaches for embodiments of the present invention. A word processing program, spreadsheet application, web browser, operating system, enterprise application, mobile application, embedded application and other plug-in or standalone applications are all possible embodiments of the present invention.

As following is an exemplary preferred embodiment implementation solution, a Java standalone application for a language-based dialog system, to illustrate the fundamentals behind the design and implementation of the present invention. Beyond this, choosing any particular type of programming languages is in no way perceived a prerequisite for embodiment of the present invention. As a matter of fact, implementation of some of its functionalities included in the embodiments may be better achieved even with other programming languages, e.g. Javascript.

In particular, some detailed approaches that are involved in description of the content and its preferred embodiment set forth in spirits of the present invention for explanatory or exemplary purpose only; in further particular, some detailed formalities of the implementing programming language are in no way perceived constraints on the content of claims of the present invention.

1. The Constitution of Core System Components

The semantic representation devices (1) gets its implementation in Java programming language, while the language presentation device (4) contained in the language-based dialog devices (5) gets its implementation with the use of HTML.Element class, an instance of Java class peered to HTML based text document. The dialog system has its implementation based on Jena, a platform for semantic web development by Hewlett-Packard. Triple like RDF statement, Jena RDQ and Jena Rule are utilized as language presentation devices in collaborating with the Jena platform; Jena RDQ and Jena Rule are Jena implementations respectively for W3C SPARQL and RULE ML. Being a platform for semantic web applications, Jena provides technical support in maintenance of dynamic conceptual systems.

1) Establishing an interface program module IResource.java for conceptual objects.

The top level abstraction in representation of a concept object peered in RDF system, has two properties associated, i.e. the unique identification code, e.g. uri, and the name.

```
import java.util.Locale;
public interface IResource{
// Semantic representation of a concept corresponding to RDF.Resource
public String getUri( );// get the URI of RDF.Resource
//public void setUri(String uri);// set the URI of RDF.Resource
public String getName(Locale locale);// get RDFS.Label
//public void setName(String name, Locale locale);// set RDFS.Label
}
```

2) Establishing interface program module IClause.java for language components.

Language components interface program module IClause.java is created as an implementation of the semantic logic representation device (1). The device, as super class program module of that for all other language components, has two functions associated, the first one is function (11), format(Locale locale) and the other one is function (12), parse(ClauseExp clause).

```
import javax.swing.text.Element;
public interface IClause extends IResource {// logic representation
device (1)
public String[ ] format(Locale locale);// function (11)
public IClause parse(Element clause);// function (12)
// here javax.swing.text.Element is the chosen approach in
implementation of the ClauseExp language presentation device (4)
}
```

3) Establishing Clause.java as implementation of IClause.java. Here comes Clause.java as an exemplary implementation of IClause, the interface program module for language component, with the set of program codes illustrating those functions and semantic markups that are commonly utilized by program module for language components.

```
import javax.swing.text.Element;   import java.util.Locale;
public abstract class Clause implements IClause {
public static Locale HTML_Chinese = Locale.Chinese.China;   public static Locale
HTML_English = Locale.English.US;   public static Locale JENA _RULE = new
Locale("en", "US", "Jena _rule");
public static Locale JENA _RDQ = new Locale("en", "US", "Jena _query");
// as following comes with some exemplary markups to be embedded in language
components
public static String TYPE = "type";   public static String STATEMENT =
```

```
"STATEMENT"; public static String COMPONENT = "COMPONENT"; public static
String QUERY = "QUERY"; public static String MODEL = "MODEL"; public static
String LANG = "LANG"; public static String PARSER = "id";// an HTML.Attribute.ID,
// PARSER may also be another HTML.Attribute.Tag instead
    public String toHTMLTag(Locale locale){return format(locale)[0];}
// with an HTML_Chinese parameter input, it is a conversion of HTML text in Chinese
// with an HTML_English parameter input, it is a conversion of HTML text in English
    }
    public String toJena Rule( ){ return format(JENA _RULE)[0]; }
    public String toJena Query( ){ return format(JENA _QUERY)[0]; }
    public String[ ] format(Locale locale);
      public IClause parse(Element clause); } }
```

2. The Representation of Sentence and Sentence Constituent

As following is the exemplary program module in constructing representations of sentence and sentence constituents. Through the two types of language components that are most frequently utilized. It showcases the general procedure in constructing representations of all other language components, though some other language components of higher complexity are to be introduced sequentially in the following paragraphs as demonstrations of the system extension.

1) Establishing interface program module for a sentence object, ISentence.java,

```
public interface ISentence extends IClause {
    public String toSentenceTag(Locale locale);
```

```
// converting into text presentation of sentence (with no separate
constituent exposure for edit)
// with an HTML_Chinese parameter input, it is a conversion of HTML
text in Chinese
// with an HTML_English parameter input, it is a conversion of HTML
text in English
} }
```

2) Establishing implementation program module Statement.java for sentence object.

Here comes Statement.java as an exemplary implementation of ISentence.

```
    public class Statement extends Clause implements ISentence{ IComponent subject;
IComponent predict; IComponent object; public Statement( ){.... }
    public IComponent getSubject( ){return subject;}
    public IComponent getPredict( ){return predict;}
    public IComponent getObject( ){return object;}
    public void setSubject(IComponent subject){ this.subject = subject; }
    public void setPredict (IComponent predict){ this.predict = predict; }
    public void setObject (IComponent object){ this.object = object; } ....
    // As following are some exemplary markups to be utilized for language components
    public static String SUBJECT = "SUBJECT";
      public static String PREDICT = "PREDICT";
      public static String OBJECT = "OBJECT";
      . . .
    public String toSentenceTag(Locale locale){ toHTMLTag (locale) ; }
    // The implementation of a formatter is exemplified as following
    public String[ ] format(Locale locale){
        String chinesePattern = ne1$1s的%2$1s是 %3$1s";
// for a syntactic model with results something like "某某的名字是张三 (someone's name is
Zhang San)"
        String englishPattern = "The %2$1s of %1$1s is %3$1s";
// a syntactic model with a result something like "The name of sb. is John"
        String Jena Pattern = "{ %1$1s %2$1s %3$1s}";
//a syntactic model for a triple with a result something like "{ <sb>. <name> "John"}"
```

String Result;

```
if (locale == HTML_Chinese){
result = String.format(chinesePattern, subject.format(locale), predict.format(locale),
    object.format(locale) );
}else if (locale == HTML_English) {
   result = String.format(englishPattern, subject.format(locale),
   predict.format(locale), object.format(locale) );
  }else{
   result = String.format(Jena Pattern, subject.format(locale),
   predict.format(locale), object.format(locale) );  return new String[ ] {result };
   //embedment of markups is not required in Jana codes format
  }
    //embedment of language component markups are required in the result with the
following codes for instance
```

```
        // in achieving its well formed text presentation in conforming to HTML
specification
        String attr = Util.attr(TYPE, STATEMENT);      attr += Util.attr(LANG,
locale.toString( )); attr += Util.attr(PARSER, this.class.getName( ));
    // helper location markup for its parser
        result = Util.toTR(result, ""); result = Util.toTable(result, attr);
        return new String[ ]{result};
    // due to the variation of syntactic patterns, multiple results to be possibly returned.
    // although only an exemplary procedure is here presented.
        }
    // coming up is an exemplary implementing of parser
    public IClause parse(Element eltClause){
        IClause result = new Statement( );
Vector subject = Util.getChildValue(eltClause, TYPE, SUBJECT);
Vector object = Util.getChildValue(eltClause, TYPE, OBJECT);
Vector predict = Util.getChildValue(eltClause, TYPE, PREDICT);
result.setSubject(new SComponent(subject, ...));
result.setObject(new SComponent(object, ...));
result.setPredict(new SComponent(predict, ...));
return result;   } }
```

3) Establishing interface program module IComponent.java for language component

The content of interface program module IComponent.java in representing language component in Java is shown in the following codes,

```
    public interface IComponent {
    public Object getValue( );
// returns content of a language component, either URI of conceptual
object or literal type data that are commonly utilized in traditional
applications.
        public String getRange( );
        // returns URI of a Class object in W3C RDFS
        public String getType( );
        // returns the type of the language component, e.g. subject
```

-continued

```
(SUBJECT), predicate (PREDICT), object (OBJECT) and so on
        public String toComponentTag(Locale locale);
        // returns its text presentation for the sentence constituent
        // with an HTML_Chinese parameter input, it is a conversion
of HTML text in Chinese
        // with an HTML_English parameter input, it is a conversion
of HTML text in English
        ..... }
```

4) Establishing implementation of IComponent.java with SComponent.java

The program module SComponent.java is an exemplary implementation of IComponent.java for sentence constituent.

```
        public class SComponent extends Clause implements IComponent {
        Object value;
        // sentence constituent may be the URI of a conceptual object or other literal data type
// a Resource or Literal defined in W3C RDF, each is referred to as RDF.Resource and RDF.
Literal respectively
            String range; // the range of the value, the content of current language
component, which is an URI of
            // a Class object defined in the W3C RDFS for its representation
            String type; // The types of language components, e.g. subject (SUBJECT), predicate
(PREDICT), object (OBJECT) and so on
            public Object getValue( ){return value;}
            public String getRange( ){return range;}
            public String getType( ){return type;}
            public static String RANGE = "valueClass"// exemplary value
            public SComponent (Object value, String range, String type){
this.value = value;  this.range = range;  this.type = type; }
            public String[ ] format(Locale locale){   String result ;
if (locale is JENA _RULE or JENA _RDQ) {
    if (value instanceof IResource) {// in case of a RDF.Resource instance
        String uri = ((IResource)value).getUri( ); result = Util.toTag(uri);
        //create result something like "<http://www.pentedge.com/schema#statement>"
        }else { result = String.valueOf(value); }
        ........// based on the value above, the process of computation here comes up with a
result conforming to Jena platform specification,
            //For example, Util.toTag(value);
            .....
            return new String[ ]{result }; }
            if (value instanceof IResource) {// in case of a RDF.Resource instance
            String name = ((IResource)value).getName(locale);
            String uri = ((IResource)value).getUri( );
            // Get the name of RDF.Resource
            //Util.getName(value, locale);
            result = Util.toHref(uri, name); // get its hyperlink representation
            }else {
            result = value.toString( ); // get a string representation of RDF.Literal type data
            }
```

```
        // Note the embedment of markups shows in the following example codes
contributes to implementation of semantic markups based editing
        String attr = "";   attr += Util.attr(TYPE, type +"&&" + COMPONENT);
        attr += Util.attr(PARSER, this.class.getName( )); // for location of the formatter
        attr += Util.attr(LANG, locale); // language identification code of the text presented
        attr += Util.attr(RANGE, range); // to be utilized for editing and validation
        attr += Util.attr(til.attr(isValid( )?anormalStyle": "warningStyle");
        // to differentiate a valid input from an invalid input in their presentation.
        result = Util.toTD(result, attr); // to a result of HTML.Tag.TD tag
        return new String[ ]{result}; }
        public boolean isValid( ){ // the process of validition
        boolean result = Util.checkRange(getValue( ), getRange( ));
            // valid input against its range restriction through a third party platform
            return result; }
        public IClause parse(Element clause){    Util.getValue(clause);    } }
```

5) Establishing interface program module ICompound.java for sentence group

```
        public interface ICompound {
            public void setSentence (ISentence [ ] statements);
            public ISentence [ ] getSentence ( ); }
```

6) Establishing program module Compound.java for compound sentence

```
public class Compound extends Clause implements ICompound,
ISentence {
ISentence [ ] sentences;
public void setSentence (ISentence [ ] statements){......}
public ISentence [ ] getSentence ( ){ return sentences;}
IComponent[ ] counjections; // for value of Conjunctions
public String[ ] format(Locale locale){
        String result = "";
        for ( i = 0; i < sentences.length; i++) { result += sentences
        [i].format(locale);
            result += counjections[i]format(locale); // The exemplary use of
        conjunctions ......// other issues to be addressed here
        }
......// here further puts other additional processing codes
return new String[ ]{result }; }
public IClause parse(Element clause){....} }
```

7) Establishing interface program module IDialog.java for a dialog object

```
        public interface IDialog{
// the following codes should convert a given clause into its text representation with
HTML.Tags,   before enclosing it with an HTML.Form tag and return
        public String addForm(IClause clause, Locale locale);
// the following codes should convert a given clause into machine language before sending to
a third party platform for processing and result returned
// For example, converting the clause into Jena format before sending it to Jena platform for
processing
        public String execute(IClause clause);
    // the class of Source is a representation of third party platform as data source
        public Source getSource( ); }
        public class Source extends SComponent {
            // the class of Source is a representation of third party data source
        public String getRange( ){
            return range;
        // must be Uri of a database, OWL.Ontology or other data sources type
        }
        ...... }
```

8) Establishing program module Query.java for the query sentence

```
        public abstract class Query extends Compound implements IDialog {
        public void setCondition(ISentence[ ] conditions){ super.setSentence
        (conditions); }
        public ISentence [ ] getCondition ( ){    return super.getSentence
        ( );    }
        public String addForm(IClause clause, Locale locale){
        String result = clause. toHTMLTag (locale);
        ......
        // to get its HTML.Tag text representation of the clause before enclosing
        it with HTML.Form and return.
            return result; }
        public String execute(IClause clause){    Object result = ......//
            // to convert clause into machine readable codes before sending to a
        third party platform for processing and returned query solution...
            // For example, the clause is into Jena format before sent to Jena
        platform .....
        // Processing result, and forming user data that is acceptable, e.g. HTML
            return result.toString( );    }    }
```

9) Program module Variable.java for Variable object. Variables as pronoun play very important role in representation of complex sentences, e.g. rules, queries and others; it is variables that actually have simple statements connected to each other in forming a complete representation of complicated semantic content; it is variables that in a query sentence, take the role in representing query target items. Variable.java is an implementation of IComponent and suits its purpose in particular.

```
public class Variable extends Compound implements IComponent {
String name;
public Variable(String name, ISentence[ ] attributeClauses)
{ this.name = name;
    super.setSentence(attributeClauses);   }
public String[ ] format(Locale locale){   String result = "";
    if (locale == JENA __RULE或 locale == JENA __RDQ) {
        result = "?"+name;
    // result is something look like ?x,
    //Generic expression of variable in the SPARQL
    ...
    return result ;   }
// description of attribute clauses as sentence constituent
usually takes several
Statements with contained variables
    for ( i = 0; i < getSentence( ).length; i++) { ...
        result += getSentence[i].format(locale);
        result += ... // additional processing to be here
    }
    ... // further additional general processing to be here
    return result;   }
public IClause parse(Element clause){   ... } }
```

Figure 4:
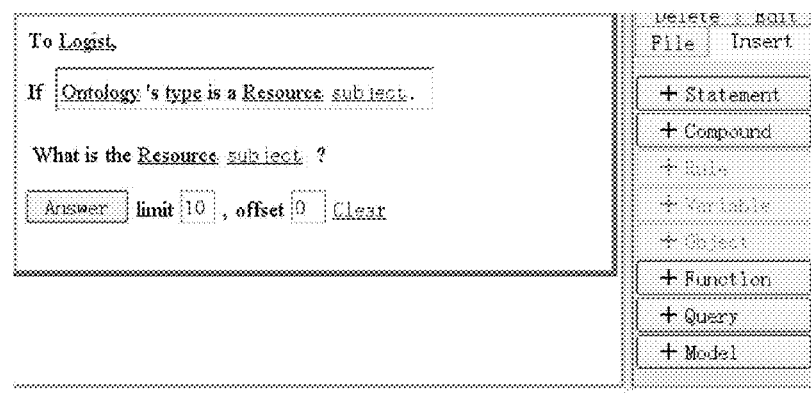
FIG. 4 illustrates a graphical user interface of the language-based dialog device included in the preferred embodiment of the present invention. Listed right side of the interface, the buttons are to be utilized as triggers of input events for user editing operation; an exemplary query sentence is presented in the center part of the UI, wherein the editable language components are shown in blue color and with underlines; the background color of an current located language component is yellow; the query sentence is technically enclosed with an HTML.form tag, which may be sent to a third party platform for processing, accomplishing the supposed interaction.
Figure 5:
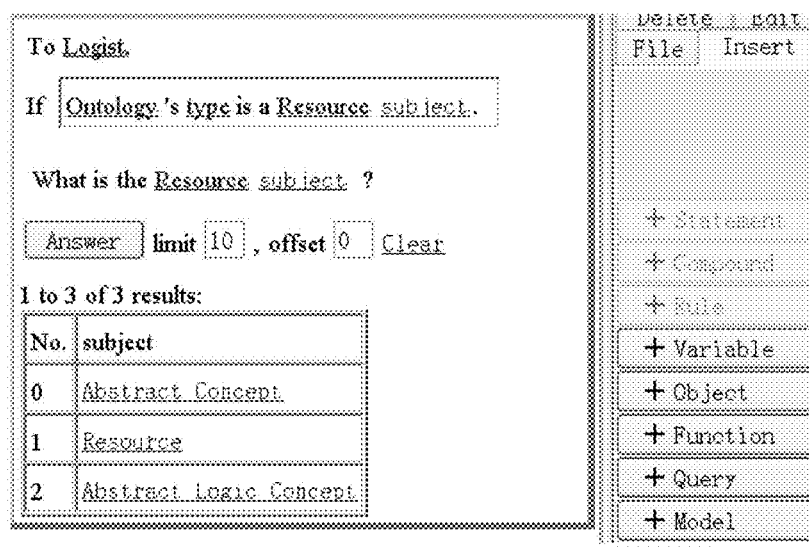
FIG. 5 shows a result of the query sentence in the form of tabular, included in the embodiment of the present invention.
Figure 6:
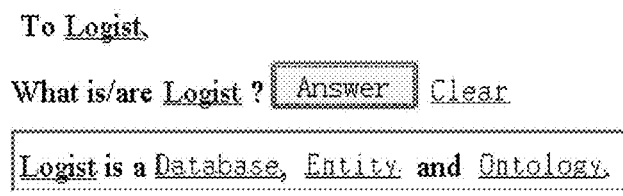
FIG. 6 shows a result of the query sentence in form of sentences, included in the embodiment of the present invention.
Figure 7:
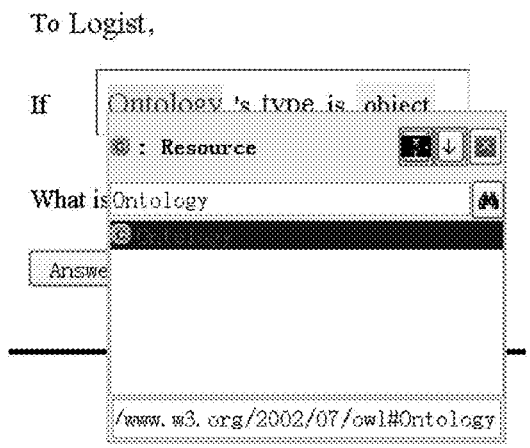
FIG. 7 shows a sample specialized editor interface for sentence constituents in an embodiment of the present invention, in which the interface contains input boxes for both unique identification code and name of an object.
Figure 8:
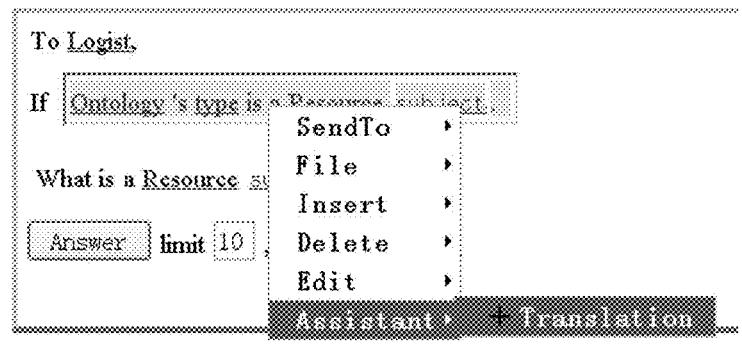
FIGS. 8, 9 and 10 illustrate how menu items as triggering translation program, list of options for valid conversion and the result of translation conversion are particularly presented in the user interface. As its color switching from black to light grey, a button listed on the right side of the UI represents an option that is disabled for the current located component.
Figure 9:
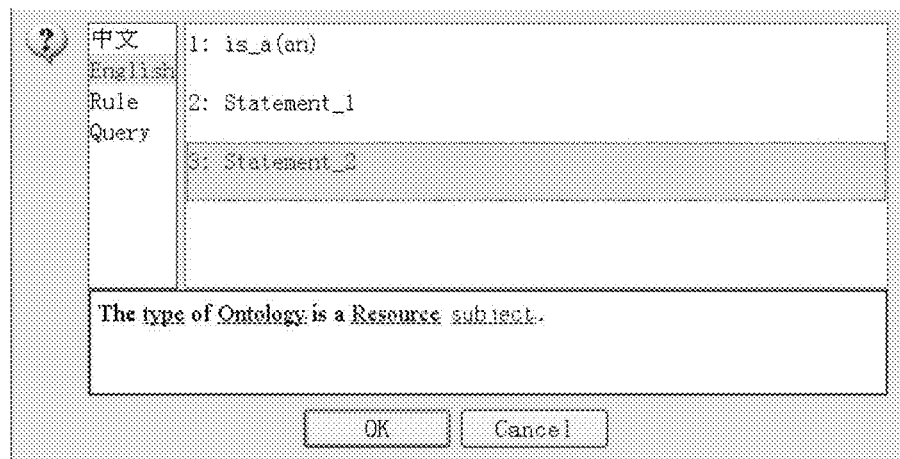
Figure 10:
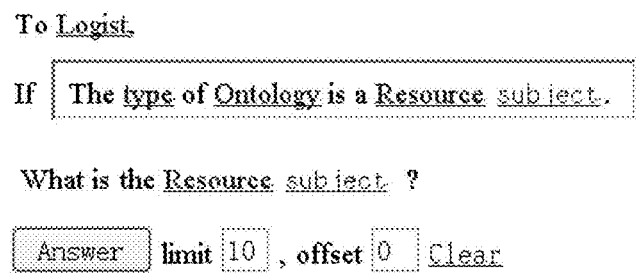

10) Establishing sentence pattern: "If . . . then . . . what is . . . ?" The following set of codes exemplifies implementation of query sentence with established sentence pattern for "If . . then what is . . . ?" This sentence is to convert into a SPARQL.Select query command interacting with the system. The sentence includes two components, the definition and list of target items with variables as pronoun and is structured something like "If [descriptive definitions] then what is [list of target items] . . . ?" FIGS. 4, 5 and 6 illustrate the process of presentation, manipulation and execution of a query sentence.

```
public class Select extends Query implements IDialog {
Variable[ ] selects; // Selecting the target conceptual object
public void setSelect(Variable[ ] selects){   this.selects = selects; }
public Variable[ ] getSelect ( ){   return selects;   }
public String addForm(IClause clause, Locale locale){
String result = clause. toHTMLTag (locale);
...
// Converting clause into text representation of HTML.Tag before
enclosing it with an HTML.Form tag and return
return result;   }
public String execute(IClause clause){   String query =
format(JENA__RDQ)[0]
Object result = ....//
// Converting the sentence into Jena format before sending it to Jena
platform
// to get the respond results
...
// put additional processing on the result in forming user readable data,
e.g. HTML
//return result.toString( );   }
public String[ ] format(Locale locale){   String result ;
    if (locale = = JENA__RDQ){
        String pattern = "SELECT %1$1s FROM %2$1s WHERE
        {%3$1s}";
        String items = "";
        for( i=0; i<selects.length; i++){
            items += selects[i].format(locale);
            ...
        }
String from = getSource( ).format(locale);   String where = "";
for( i=0; i < getCondition( ).length; i++){
    where += getCondition( ) [i].format(locale);
    ....}
...
result = String.format(pattern , item, from, where); return new
String[ ]{result }; }
... //please refer to Statement.java to put additional codes here
} }
```

3. More Language Component Support

As shown below are implementation frameworks for rules, functions and other types of language components, which also showcase the design and implementation for even more other types of presentation of language components.

1) Establishing program module Rule.java for a rule sentence object

```
public class Rule extends Compound {
public Rule( ){ super.setSentence(new ICompound [2]);
    ... // here to set conjunctions for this rule sentence, e.g. "if . . .
    then . . . "
}
public void setBody(ICompound body){ // here to set precondition of this
    //   rule which is comprised of a plurality of sentences
super.getSentence ( )[0] = body; }
public ICompound getBody ( ){ return    (ICompound)
super.getSentence ( )[0]; }
public void setHead(ICompound head){ super.getSentence ( )[1] = head; }
public ICompound getHead ( ){ return    (ICompound)
super.getSentence ( )[1]; }
... }
```

2) Establishing program module Function.java for function object

A function conceptual object is the formalized representation of a complex sentence. With reasonable design and implementation of its formatters, a given function may as well be able to get its presentation in conforming to natural languages habits and be target open for following-up editing operations. Essentially, this is to technically ground natural language sentence representation with contained verbs.

As one of its complex natures, a function takes form of either a sentence or a sentence constituent. In form of a sentence, its input arguments represent its subject constituent, its predicate constituent is a verb and its object constituent is a variable. In form of a sentence constituent, its input argument are subject constituent; predicate constituent is a verb, its results, the object constituent of the sentence, is the semantic content per se represented by the function in its holding place.

```
public class Function extends Statement implements IComponent {
public IComponent getSubject( ){ Argument result = null;
    try{ result = (Argument)super.getSubject( )
        // the subject of the function must be an instance of Argument
    }catch(Exception ex){ }
    return result;   }
public IComponent getPredict( ){ Verb result = null;
    try{ result = (Verb)super. getPredict ( );
        //the predicate of the function must be an instance of Verb
    }catch(Exception ex){ }
    return result;   }
public IComponent getObject( ){ Variable result = null;
    try{ result = (Variable)super. getObject ( );
        // the object of the function must be instance of Variable
    }catch(Exception ex){ }
    return result;   }
public String toComponentTag(Locale locale){
// in form of a sentence constituent, the function will only have its name
and input parameter presented
}
public String toSentenceTag(Locale locale){
    // in form of a sentence, function will usually have both its name,
parameter part and result presented
}
...
// a set of codes is required for registration of formatters for each type of
functions
static{   Util.regis ter(". . . ", . . . , . . . );   }   }
```

3) Establishing program module Verb.java for verb object. As a special language component, verb (Verb) is a specific implementation of IComponent.

```
public class Verb extends SComponent {  ... }
```

4) Establishing program module Argument.java for function input argument object

```
public class Argument extends SComponent { int countOfArgument;
 // representing the number of its input argument types, it is possible to take a value of zero
 IComponent[countOfArgument] prejects;
     // to put here representations of prepositions,
     //which is possible a null in some circumstances
 IComponent [countOfArgument ] arguments;
  // each argument may be connected with a corresponding preposition
 ... }
```

5) Establishing program module IParagraph.java for paragraph object

```
public class Paragraph implements ICompound {  ... }
```

4. Converting devices and the registry
1) Establishing IFormater.java
IFormater.java is an interface module in combination of the semantics-to-language converting device (2) and language-to-semantics converting device (3). The semantics-to-language converting device (2) includes a function (21), which, as called upon, will forward convert a semantic logic representation device (1), as its input argument, into its language presentation device (4) in conforming to given language habits and conventions. The language-to-semantics converting device (3) with an included function (31) is a set of program code associated with an information processing device.

```
public interface IFormater{
  public String[ ] format(IClause clause); // Function (21)
  public IClause parse(Element eltClause); // Function (31)
}
```

As following are some exemplified implementations of IFormater.
2) Establishing Statement2HTML.java, a formatter to convert sentence into HTML text representation in Chinese.

```
public class Statement2HTML_zh implements IFormater {
 String pattern = "%1$1s的 %2$1s是 %3$1s";
 // the syntactic pattern is for an output something like "某某的名字是张三 (someone's name is Zhang San)"
  public String[ ] format(IClause clause){
 String result ; Statement stm = (Statement)clause;
   Locale locale = Clause.HTML_CHINESE;   result = String.format(pattern, stm.getSubject( ).format(locale),           stm.getPredict( ).format(locale),
   stm.getObject( ).format(locale) );
 // the following code is to put semantic markups into the result
 // in achieving well formed HTML text representation
 String attr = Util.attr(TYPE, STATEMENT);
   attr += Util.attr(LANG, locale.toString( ));
   attr += Util.attr(PARSER, this.class.getName( )); // location indicator of its parser
 result = Util.toTR(result, ""); result = Util.toTable(result, attr);
 return new String[ ]{result};   }
 public IClause parse(Element eltClause){ . . .
 // please refer to Statement.java for details in relevant to this part of implementation
 } }
```

3) Establishing Statement2HTML_EN.

The formatter is to convert sentence into its English version HTML text:

```
public class Statement2HTML_EN implements IFormater {
  String pattern = "The %2$1s of %1$1s is %3$1s";
  // the syntactic pattern is for an output something like "The name of sb. is John"
  public String[ ] format(IClause clause){ String result ;
   Statement stm = (Statement)clause;
   Locale locale = Clause.HTML_ENGLISH;
   result = String.format(pattern, stm.getSubject( ).format(locale),
                stm.getPredict( ).format(locale),
                stm. getObject( ).format(locale) );
  //the following is to form its well formed text representation in HTML
  String attr = Util.attr(TYPE, STATEMENT);
   attr += Util.attr(LANG, locale.toString( ));
   attr += Util.attr(PARSER, this.class.getName( )); // location indicator of its parser
   result = Util.toTR(result, "");   result = Util.toTable(result, attr);
   return new String[ ]{result};   }
  public IClause parse(Element eltClause){  . . .
 // please refer to Statement.java for details relevant to this part of implementation
   } }
```

4) Establishing Statement2JENA .Java, a formatter to convert sentence into its text representation as triples:

```
public class Statement2JENA   implements IFormater {
   String pattern = "{ %1$1s %2$1s %3$1s}";
  // the syntactic pattern is for an output something like "{ <sb> <name> "John"}"
   public String[ ] format(IClause clause){   String result ;
   Statement stm = (Statement)clause;
   Locale locale = Clause.JENA_RDQ;
   result = String.format(pattern, stm.getSubject( ).format(locale),
                 stm.getPredict( ).format(locale),
                 stm.getObject( ).format(locale) );
   return new String[ ]{result}; }
   public IClause parse(Element eltClause){  . . .
  // please refer to Statement.java for details relevant to this part of implementation
   } }
```

5) The improved implementation of Clause.java.

As following is an improved implementation of Clause in achieving delegation with additional functions included in order to get a list of valid formatters and forward control to its delegation implementations.

```
public abstract class Clause implements IClause {
   ...
   // here to put the implementation codes for the additional function
   public IFormater getFormater(Locale locale){
      return Util.getFormater(this.class.getName( ), locale); // for example
   }
// implementation of format
public String[ ] format(Locale locale){
   IFormater[ ] formatters = getFormater(ocale);
   String[ ] result = new String[formatters.length];
   for ( i = 0; i < formatters.length; i++) {  result[i] =
   formatters.format(this);
       . . . // here to put additional processing
}
   . . . // here to put further additional processing
return result;   }  . . .  }
```

6) The improved implementation of Statement.java. As consequence, additional codes need to be put into the statement program module for registration in company with some other adjustments to the statement program module.

```
public class Statement extends Clause {  . . .
static {   registerFormater( );   }
static registerFormater( ){
   // Registering formatters for the given statement
   String key = Statement.class.getName( ); // Or assigned with other values
   Util.register(key, HTML_CHINESE, Statement2HTML_ZH);
   Util.register(key, HTML_ENGLISH, Statement2HTML_EN);
   Util.register(key, JENA _RDQ, Statement2JENA);
   . . . }
public IFormater getFormater(Locale locale){
   String key = Statement.class.getName( ); // Or assigned with other
   values
      return Util.getFormater(key, locale); }
public String[ ] format(Locale locale){   return super.format(locale); }
   . . . }
```

7) Improved implementation of other language components. For other language components, improved implementation can make into place analogous to that of the Statement. java for their language presentation forms to be flexibly achieved through formatter delegation.

5. Language-Based Dialog Device

As an exemplary preferred embodiment, the language-based dialog device (5) for semantic content browsing and editing is to get its implementation through JTextPane, which, plus some other programs modules, provides technical support throughout the implementation of functionalities of browsing, presentation, editing and collaboration.

1) Browsing and presentation. Implementation program modules of interface IClause generate HTML text. It is the HTML text generated by the IClause modules that play important roles getting effective implementation of language presentation device (4). Embedded with semantic logic markups, the HTML text is directly accepted and rendered by javax.swing.text.JTextPane. The HTML text is transparent to end user who will not perceive their existence. By taking advantage of javax.swing.text.HTMLDocument and related program modules, the HTML text also helps to take good control to its corresponding HTML ELEMENT node tree, further contributing to the implementation of other features of the present invention in particular.

2) Locating the language components. Taking advantage of javax.swing.text.JTextPane, the human-machine interaction interface may have its implantation put in place, e.g. interface for program module in locating language components. It is the program module established as a mouse event listener that provides a particular implementation to locating procedure with the following contained steps, (1) With a mouse or keyboard input at a particular position in its surface (indicating the point is of user's interest), the instance of JTextPane provides underlying technical support in locating a ELEMENT node right on that point, which is referred to as focusedElement;

(2) Try to read out the value of "type" attribute associated to the focusedElement if it has this attribute associated, otherwise the parent node of the current focusedElement is set to be the current focusedElement, focusedElement=focusedElement.getParent( ); repeats this process until successfully get the read-out of "type" attribute of focusedElement, or otherwise the whole procedure ended up with an exception captured;

(3) It is the focusedElement with associated "type" attribute that constitutes a language component node, and it is the value of its "type" attribute that may be utilized to see if the node is a sentence or a sentence constituent. The detailed steps may include either a match test to see if the string value contains a substring of "COMPONENT" or directly converting the language component into an instance of Clause module to see if it is implementation module of IComponent or ISentence interface; to convert the language component node, focusedElement, into an instance of Clause module, it includes a step of reading out the value of "PARSER" attribute associated to it in determination of the name of a formatter, instance of IFormater, corresponding to that language component, before an instance of the formatter is created and a procedure call is forward to its parser( ) member method of that instance of formatter;

(4) If it is a sentence constituent, the focusedElement is then determined, when it is necessary, to be an editable or focusable sentence constituent by reads-out of its markups designated for this particular usage; otherwise the current focusedElement is repeatedly to be set to its parent node until a sentence node is reached, which the language component belongs to;

(5) Setting the background color of focusedElement to yellow.

3) To create and insert a language component. To create and insert a language component, listening program module for mouse, keyboard input event and the like are required in fulfilling the following steps, (1) Determining the types of language component that can be inserted by the user according to the type of the current focusedElement language node and semantic logic rules, e.g., statement, query, variable, functions or rules and etc.;

(2) After confirmation of the user's selection, a step will be required to determine either the position of insertion or the types of valid operations, e.g., replacing the current sentence, performing insertion before or after the current sentence;

(3) After confirmation of the user's selection, a step will be required to create an instance of program module, which implements IClause interface, for the corresponding language component;

(4) Forward call into the toHTMLTag member method of that instance of its program module, to create its HTML text in a language that is currently put in use;

(5) To complete the insertion operation of the above generated HTML text into a position given in the current HTMLDocument, the HTML text is parsed into HTML ELEMENTS and insertion operation is carried out in the document element tree with currently available technical support to HTML Document. An inserted sentence, for instance, may be possible just a "blank sentence" with a given logical structure and set of conjunctions etc. To edit and modify the sentence constituents which are left blank are the only operations remained to be carried out by the user in completing editing operation on the whole sentence.

4) To edit and modify. As a sentence node or sentence constituent node, the current focusedElement may be target of, for instance, such operations as delete, copy and paste, drag and drop, which as such turns out to be solid technical foundation of quick sentence construction and duplication.
(1) To delete the focusedElementt, operation will simply be carried out by means of removing it from the HTML-Document node tree;
(2) To copy the focusedElement, operation will be carried out by means of converting focusedElement into an instance of Clause program module or HTML text before putting it into the system clipboard, Clipboard;
(3) To paste a language component, operation will be carried out by means of getting a Clause module instance or HTML text from the system clipboard, Clipboard, followed up with a conversion of the instance of the Clause module into its HTML text representation in case it is an instance of Clause, and then a confirmation of user's selection, either a replacement of the current language component or an insertion and the place where the insertion operation to perform according to the type of the current language component node, before finally carrying out the operation by means of either inserting into the HTMLDocument node tree or replacing the current node with the HTML text;
(4) To drag and drop the focusedElement, operation will be carried out by the following steps. As drag operation starts, the focusedElement source node will be converted into an instance of Clause module or its HTML text representation before putting it into an instance of java.awt.datatransfer.Transferable as the content of the system transferrable; as drag continues with mouse moving, focusedElement is constantly switched to a new node as target node very much the same way as in locating a language component; accompanied with a verification, according to the type of the drag source and target node and semantic logic rules, on the value of source node acceptable to the drag target node alongside a list of valid operations to be presented for the user's selection; as the drag ends with the releasing of the mouse, according to the user's choice and the semantic rules, operation is then decided to continue or to reject.

As compared with the traditional textual based input solution, it avoids large amount of repetitious input and frequent keyboard operations and, as such, it holds obvious efficiency advantage.

5) Specialized editor for sentence constituent. In case it is a sentence constituent, the current language component focusedElement may be target subject to such operations as delete, copy and paste, drag and drop and insertion of additional sentence constituents. Beside of this, it is also possible to get its input with a specialized window editor as user interface, detailed steps includes:
(1) An editor window interface program is to be triggered into execution in response to a double click carried out by the user on the place where falls within the region of the language component;
(2) The program determines the range of the input content according to the reads-out of the markups for current language component;
(3) Displaying filtered data from a history list constrained by the range value for the user's further selection;
(4) if the data user wanted is not included in the history list, the user may choose either to input a piece of relevant information, e.g. characters and the like, to locate the input object with a constraint search from within the given range or to directly input the content of the language components with either straightforward keyboard type-ins of values for literal types or unique identification code, name or the likes in locating a conceptual object;
(5) with the input or data selected by the user from the option list, operation is then carried out to replace the current sentence constituent and accumulate in the history list, which is accompanied with an input validation when it is necessary, leading to, for invalid input, either a rejection of the operation or embedment of markups designated (e.g. switching of the background color) prompting for the user's further correction.

6) The function of translation or conversion. In case it is a sentence or sentence constituent node, the current language component, focusedElement, may become separate target of translation or conversion operations in achieving its text representations in a flexible and dynamic manner. This task is to be accomplished with an established program module for the purpose of translation or conversion as user interface program,
(1) As trigged into execution by a user input event, the translation conversion interface program converts the focusedElement into an instance of corresponding Clause program module. The program reads out the value of "PARSER" attribute for that node, use the reads-out in recognizing its formatter's name to get an instance of the formatter (an implementation of IFormater interface), before forwarding the call into the formatter instance's parser( ) member method to get the instance of Clause as a result;
(2) With the instance of Clause above, it is possible to get a list of all the valid formatters for the focusedElement in each type of language. The list of formatters may be thereof presented to the user via the interface program alongside a preview of conversion result for the user's selection;
(3) According to the user's selection, operation is carried out to replace the current language component focusedElement with the conversion result of selected formatter.

7) The registry of semantics and language converting devices. Since the program codes for improvement implementation of Clause and Statement both includes some sample implementation of the registry for semantics and language converting devices, please reference the content of the two program modules: getFormater( . . . ), register( . . . ) and Util.register( . . . ) all have detailed annotation attached.

8) The functionality of collaboration. The function of collaboration is achieved through implementations of IDialog.java, which essentially includes steps as following:
(1) implementation of IDialog is to include a segment of code to add an HTML.Form to a language component, which leads to installation of an user interface facilitating sending request to a third party platform;
(2) As the user sends out a request through this user interface, the implantation codes of execute( ) is then triggered into execution, and this segment of codes is to initially convert the sentences included into a set of Jena codes before sending it to the Jena platform and receiving the returned results; finally the results is displayed; Due to the returned results may be in a format of either data table or a sentence or a set of triples, it is necessary to get the results formalized into HTML text before returning it to the calling client interface for presentation.

9) Persistence and Sharing. Facilitated by HTMLDocument, JTextPane may have all the rendered document content transferred into HTML text with all embedded markups included, and therefore to be able to have the document stored in disks or shared all over the world online.

6. Utility Module Util.java and Third Party Platforms

Utility program module Util.java contains some utility functions to take advantage of the services and supports closely relevant to the implementation of the present invention. These services and supports are to be obtained from different sources.

1) Utilities for semantic markup editing

```
import javax.swing.text.HTMLDocument;
public class Util {
public static final String toHref(String uri, String title) {
   String attr = attr("href", uri);
   return toNamedTag("a", title, attr); }
public static final String toTable(String value, String attr) {
   return toNamedTag("table", value, attr);   }
public static final String toTD(String value, String attr) {
   return toNamedTag("td", value, attr);   }
public static final String toTR(String value, String attr) {
   return toNamedTag("tr", value, attr);   }
// to create text for an HTML tag
// For example, <table id = "" type= STATEMENT> . . . </table>
public static final String toNamedTag(String tagName, String value, String attr) {
String result = ""; result = tagName + " " + attr;
  result = String.format("<%1$s>%2$s<%3$s>", result.trim( ), value, tagName );
  return result;   }
public static final String toTag(String uri) {
   String result = String.format("<%1$s>", uri);   return result;   }
public static final String attr(String name, String value) {
   // to return the text of name and value pair of an attribute, e.g. Name=John
   return String.format(" %1$s=%2$s", name, value);   }
public static final String getName(String uri, Locale locale){ String result = . . . ;
   // through the Jena platform to get the name of an instance of RDF.Resource with
the given URI value, uri
   // See RDFS.Label
   // in the Jena platform, RDFS.Label is allowed to have different values for different
languages
     // therefore, from different locale argument input different name may result
     . . .
   return result; }
   public static final String getValue (Element clause, String attributeName){
      Object result = . . . ;
     // through the algorithm contained in java HTMLDocument.class
     // to get the value of the attribute with name of attributeName for the element,
clause
     . . .
   return result.toString( );   }
   public static final Vector<Element> getChild (Element parent, String attributeName,
String attributeValue){Vector<Element> result = . . . ;
// to get a child node under parent through the algorithm contained in HTMLDocument
// with given attribute name and value pair attributeName and attributeValue
. . .
   return result;   }
   public static final Vector getChildValue (Element parent, String attributeName,
String attributeValue ){   Vector result = new Vector( );
     Vector<Element> children = getChild(parent, attributeName, attributeValue);
     for(i=0; i<children.size( ); i ++){
        result.add(getValue(children.get(i)));   }
   return result;   }
   public static final String getValue (Element component){
   // to get the identification code of a conceptual object or a literal type data for this
Element instance, component
   if (!isComponent(component)){ // if it is not Clause.COMPONENT
      return null;   }
   Object result = . . .
   // set to a value for such as an instance IResource, string or number
   return result;   }
   public boolean isComponent(Element clause){ boolean result = false;
      String type = getValue(clause, Clause.TYPE);
      result = type.indexOf(Clause.COMPONENT)>0;
      return result;   }
   public static void register(String key, Locale locale, IFormater formater){
      // here to provide registration of formatters for a language component
      // for instance a Hashtable is utilized for its data structure
      }
   public static IFormater getFormater(String key, Locale locale){
      // here to get a formatter for a language component from the registry
      } }
```

2) Utilities for collaborating with Jena platform. Utilities are to be included here facilitating collaborating with Jena platform, e.g. reading data of different text formats, logical data reasoning, supports to query operations.

```
public class Util {
    ...
    public static void checkRange(Object value, String uriRange){
        //to check with the Jena platform and see if the given value falls
        within the range of the given data type with the given URI, uriRange
        // the data type with the given URI, uriRange, is an instance of
        RDFDataType defined by JENA program package
    } ... }
```

TECHNICAL EFFECTS

The following is the summary of technical effects in accordance to the exemplary preferred embodiments of the invention, 1) The wide coverage of its functionalities. In accordance to the exemplary embodiments of the invention, the major functionalities fall within three categories. The first one is about information input, whereby pseudo-natural language based information input is the type that is machine acceptable, the type that facilitates the establishment of precise data model or data structure in information processing; the second one is about query editing, whereby pseudo-natural language are to be utilized in a query defining data items requested; the third one is about the data output, with respect to its layout, group and reuse.

Integrated with semantic web platforms e.g. Jena, the exemplary embodiments of the invention grounds its definition and maintenance of conceptual system to standards and specifications that are worldwide accepted and are very likely essential constituent part of the web application standards in the future. From the perspective of language expression, it has an open vocabulary system since vocabulary or semantic logic data may always be installed according to the need of real domain specific applications yet in a flexible manner. As such, it may fully take advantage of the semantic logic data resulted from existing applications applying different markup language specifications.

2) The competency and effectualness. It lays important theoretical foundation of the present invention that the definition of a conceptual object or human-machine communications may always be accomplished with one or integrated set of simple statements. Based on the conceptual system, the present invention provides a language presentation system for semantic content representation. Although from the perspective of its resulting expressions and grammars, it is so far in no sense as flexible as natural languages; despite of this, from the perspective of semantic logic representation, yet it remains to be a competent and effectual system. The key point is that its expressions and grammars gradually evolve and become mature as long as the formatter system improves in times, resulting to a pseudo-natural language system as effectual as a natural language.

In other words, although the expression of complex semantic content takes sets of simple statements and careful design of conceptual model, as to what extent the expressions are actually in line with the habits or grammar rules of a natural language, it really depends on the establishment of a comprehensive formatter system. What is more, through the use of the formatter delegation system, it may have different applications run jointly together for natural language processing; In case no single solution is competent for a single translation task, to join a group of applications together may be a break-through or a new direction for machine translation development.

3) The advantage it has in information processing. The language-based dialog device makes it a reality to get a text editing system that is language component based. As compared with the traditional textual based input solution, it avoids large amount of repetitious input and frequent keyboard operations and, as such, it holds obvious efficiency advantage. What is more, with the pseudo-natural language system, representation of semantic content is in a format that is acceptable to and can be utilized or reused by both human users and their software agents, to a larger extent promoting information processing automation and efficiency.

The invention claimed is:

1. A pseudo natural language based human machine dialog device (5) comprising a computer dialog device having language text represented by one or more semantic-logic-representation devices (1) and one or more language-presentation devices (4), wherein,
    a) said semantic-logic-representation devices (1) comprising one or more sets of machine codes represented by conceptual objects and/or semantic logics, and whereby at least one said semantic-logic-representation device (1) is generated for each or set of objects within a conceptual object model in accordance with class hierarchical or object containing relationships;
    b) said semantic-logic-representation devices (1) having one conversion function (11) responsible for converting said semantic-logic-representation device (1) itself into said one or more language-presentation devices (4) abiding by different grammar or syntax rules according to a mapping generated on a one-to-one basis for each semantic-logic-representation device (1) to project into one or more language-presentation devices (4), said conversion function(11) taking the semantic-logic-representation devices (1) and language identity as inputs and returns a language-presentation device (4) searched from the said mapping;
    c) said semantic-logic-representation devices (1) having one backwards conversion function(12) responsible for converting of a segment of text corresponding to one or more said language-presentation devices (4) into said one or more semantic-logic-representation devices (1) abiding by different grammar or syntax rules and programming requirements according to a generated one-to-one mapping for each language-presentation device (4) to project into one semantic-logic-representation device (1), wherein the said conversion function (12) takes said language-presentation device (4) as input and returns one or more semantic-logic-representation device (1) searched from the said mapping;
    d) said language-presentation device (4) comprising a set of symbols for presentation of a text segment representing a constituent component in a document model with a set of semantic markups embedded to identify a semantic-logic-representation device (1) and/or other interpreter corresponding to the given segment of text; and
    e) said pseudo natural language human machine dialog device (5) presenting said one or more language-presentation devices (4) to and accepts instructions from end users or third party applications through a set of computer interfaces in carrying out operations on a given segment of text while retaining unchanged integrity and legitimacy of said set of markups embedded, whereby a segment of text is capable of being focused according to input from a user or application based on the said markups embedded, said semantic-logic-representation devices (1) corresponding to the focused segment of text is located according to said semantic markups embedded and resulting in the associated conversion function (12) and (11) capable of being called upon in sequence to generate the content of semantic-logic-representation devices (1) thereafter resulting in a new version of language-presentation devices (4) in a different format or language.

2. A pseudo natural language human machine dialog device (5) of claim 1, wherein said conversion functions (11) is able to convert said semantic-logic-representation devices (1) by locating one or more corresponding said semantic-logic-representation devices (1) for each of constituent language components of a segment of text currently located and whereby said conversion functions (11) associated with each of sub-semantic-logic-representation devices located are capable of being called upon recursively until all implementation is fund to convert each said sub-semantic-logic-representation device into sub-language-presentation device resulting in at least one said language-presentation device (4) for said semantic-logic-representation device (1) is to be calculated from results of sub-function calls.

3. A pseudo natural language based dialog device (5) of claim 1, wherein at least one of said semantic-logic-representation devices (1) works jointly with a registry or index system, whereby said registry has one or more semantics-to-language converting devices (2) registered for each one or set of said semantic-logic-representation devices (1); in accordance to services provided by the said registry, said conversion functions (11) is capable of being locating and delegating its implementation to said one or more semantics-to-language converting devices.

4. A pseudo natural language based dialog device (5) of claim 3, wherein each of said semantics-to-language converting devices (2) includes another conversion function (21), wherein said another conversion function (21) converts said one or more semantic-logic-representation devices (1), according to an input of a language identity parameter (6), into said one or more language-presentation devices (4).

5. A pseudo natural language based dialog device (5) of claim 3, wherein a process of construction, registration or indexing of each said one or more semantics-to-language converting devices (2) is based on a constituent component that is predicate of a sentence or a property of a conceptual object.

6. A pseudo natural language based dialog device (5) of claim 3, wherein an extensible registry or index system is to be used to allow users register and/or unregister said semantics-to-language converting devices (2).

7. A pseudo natural language based dialog device (5) of claim 1, wherein said semantic-logic-representation device (1) works jointly with a registry, said registry has one or more language-to-semantics reverse converting devices (3) registered for each said semantic-logic-representation devices (1); in accordance to services provided by said registry, said corresponding language-to-semantics reverse converting device (3) is capable of being located according to associated semantic markups embedded in a focused segment of text before delegating implementation to said one or more language-to-semantics reverse converting devices (3).

8. A pseudo natural language based dialog device (5) of claim 7, wherein said language-to-semantics reverse converting device (3) has another backwards conversion function (31); wherein said another backwards conversion function (31) converts a focused version of one language-presentation devices (4) into one or more corresponding said semantic-logic-representation devices (1); wherein each sub-language-presentation device for each constituent language component of said focused version of language-presentation device is to be located and wherein each said another backwards conversion function (31) associated is to be called upon recursively until all of said another backwards conversion function (31) find their implementation thereof to calculate a corresponding said semantic-logic-representation devices (1) from result of each sub call.

9. A pseudo natural language based dialog device (5) of claim 7, wherein an extensible registry or Index system is to be used to allow users register and/or unregister said language-to-semantics converting devices (3).

10. A pseudo natural language based dialog device (5) of claim 1, wherein a set of user interfaces is to be used in locating of and receiving focus on language component represented by a said language-presentation devices (4) based on semantic markups embedded in a segment of text according to one or more inputs of an end user or application.

11. A pseudo natural language based dialog device (5) of claim 10, wherein an array of semantics-to-language converting devices (2) and one or more language-to-semantics converting devices (3) are to be used to convert a focused segment of text presented by one version of said language-presentation devices (4) into a different format or language; whereby the focused segment of text is capable of being converted into one said semantic-logic-representation devices (1) using a located one of said language-to-semantics converting device (3), and thereafter, with a user chosen said semantics-to-language converting device (2) said semantic-logic-representation device (1) is to be further converted into a new version of said one or more language-presentation devices (4).

* * * * *